US 9,514,292 B2

(12) United States Patent
Cambou

(10) Patent No.: US 9,514,292 B2
(45) Date of Patent: Dec. 6, 2016

(54) MULTI-FACTOR AUTHENTICATION USING A COMBINED SECURE PATTERN

(71) Applicant: Bertrand F. Cambou, Flagstaff, AZ (US)

(72) Inventor: Bertrand F. Cambou, Flagstaff, AZ (US)

(73) Assignee: Bertrand F. Cambou, Flagstaff, AZ (US)

( * ) Notice: Subject to any disclaimer, the term of this patent is extended or adjusted under 35 U.S.C. 154(b) by 0 days.

(21) Appl. No.: 14/801,180

(22) Filed: Jul. 16, 2015

(65) Prior Publication Data

US 2016/0306953 A1     Oct. 20, 2016

Related U.S. Application Data

(60) Provisional application No. 62/147,244, filed on Apr. 14, 2015.

(51) Int. Cl.
*G06K 5/00* (2006.01)
*G06F 21/31* (2013.01)
*H04L 29/06* (2006.01)

(52) U.S. Cl.
CPC ............ *G06F 21/316* (2013.01); *H04L 63/08* (2013.01)

(58) Field of Classification Search
USPC ........................... 235/382; 1/1; 713/168, 170
See application file for complete search history.

(56) References Cited

U.S. PATENT DOCUMENTS

| | | |
|---|---|---|
| 4,532,438 A | 7/1985 | Reiner |
| 4,899,154 A | 2/1990 | Colles |
| 5,500,601 A | 3/1996 | Lisart et al. |
| 5,589,785 A | 12/1996 | Garavan |
| 6,317,349 B1 | 11/2001 | Wong |
| 6,331,961 B1 | 12/2001 | Kengeri et al. |
| 6,370,061 B1 | 4/2002 | Yachareni et al. |
| 6,430,073 B1 | 8/2002 | Batson et al. |
| 6,498,751 B2 | 12/2002 | Ordonez et al. |
| 6,542,409 B2 | 4/2003 | Yamada |
| 6,873,551 B2 | 3/2005 | Bedarida et al. |
| 7,016,211 B2 | 3/2006 | Park et al. |
| 7,082,056 B2 | 7/2006 | Chen et al. |
| 7,085,155 B2 | 8/2006 | Ovshinsky et al. |
| 7,088,603 B2 | 8/2006 | Patel |
| 7,110,275 B2 | 9/2006 | Park |
| 7,307,860 B2 | 12/2007 | Hu |
| 7,342,832 B2 | 3/2008 | Lee et al. |
| 7,436,698 B2 | 10/2008 | Lin et al. |
| 7,483,305 B2 | 1/2009 | Yamada |

(Continued)

FOREIGN PATENT DOCUMENTS

WO     WO-03088256 A1     10/2003

OTHER PUBLICATIONS

International Search Report & Written Opinion, Application No. PCT/US2015/037402 Applicant, Cambou, Bertrand F., Mailed Sep. 16, 2015, 9 pages.

(Continued)

*Primary Examiner* — Daniel Hess
(74) *Attorney, Agent, or Firm* — Barclay Damon, LLP

(57) ABSTRACT

A method and system for multi-factor authentication. The method involves combining a plurality of authentication patterns into a combined secure pattern by inserting one or more spacing states into the one authentication pattern at locations based on the values of the another authentication pattern.

14 Claims, 11 Drawing Sheets

(56) References Cited

U.S. PATENT DOCUMENTS

| | | | |
|---|---|---|---|
| 7,486,530 | B2 | 2/2009 | Hartono et al. |
| 7,508,022 | B2 | 3/2009 | Amo et al. |
| 7,518,897 | B2 | 4/2009 | Nozieres et al. |
| 8,089,793 | B1 | 1/2012 | Gharia |
| 8,228,703 | B2 | 7/2012 | Javerliac et al. |
| 8,286,227 | B1 | 10/2012 | Zheng |
| 8,513,791 | B2 | 8/2013 | Bucki et al. |
| 8,576,599 | B2 | 11/2013 | Atwal et al. |
| 8,634,247 | B1 | 1/2014 | Sprouse et al. |
| 8,717,794 | B2 | 5/2014 | Cambou et al. |
| 8,749,361 | B2 | 6/2014 | Najafi et al. |
| 8,763,101 | B2 | 6/2014 | Counterman |
| 8,780,633 | B2 | 7/2014 | Sprouse et al. |
| 8,806,205 | B2 | 8/2014 | Metke et al. |
| 8,817,541 | B2 | 8/2014 | Li et al. |
| 2007/0220594 | A1 | 9/2007 | Tulsyan |
| 2008/0249947 | A1 | 10/2008 | Potter |
| 2009/0190404 | A1 | 7/2009 | Roohparvar |
| 2010/0235900 | A1 | 9/2010 | Robinton et al. |
| 2011/0249480 | A1 | 10/2011 | Cho |
| 2012/0143554 | A1 | 6/2012 | Cambou et al. |
| 2012/0272307 | A1 | 10/2012 | Buer |
| 2013/0013931 | A1 | 1/2013 | O'Hare et al. |
| 2014/0185349 | A1 | 7/2014 | Terzioglu et al. |
| 2014/0347933 | A1 | 11/2014 | Lee |
| 2015/0163056 | A1 | 6/2015 | Nix |

OTHER PUBLICATIONS

International Search Report & Written Opinion, Application No. PCT/US2015/040731, Applicant, Cambou Bertrand F., Mailed Oct. 6, 2015, 11 pages.
Content-Addressable Memory (CAM) Circuits and Architectures: A Tutorial and Survey by Kostas Pagiamtzis, and Ali Sheikholeslami, IEEE Journal of Solid-State Circuits, vol. 41, No. 3, Mar. 2006, 16 pages.
Written Opinion of the International Preliminary Examining Authority, Application No. PCT/US2015/040731, Applicant, Cambou, Bertrand F. mailed Mar. 16, 2016, 6 pages.
PCT/US2015/040731; International Filing Date Jul. 16, 2015; International Preliminary Report on Patentability; Date of Mailing Aug. 5, 2016; 8 pages.

| CAM Input\Stored | Matching? "0" | "1" |
|---|---|---|
| "0" | Yes | No |
| "1" | No | Yes |

FIG. 1A
(PRIOR ART)

| TCAM Input\Stored | Matching? "0" | "1" | "BX" |
|---|---|---|---|
| "0" | Yes | No | Yes |
| "1" | No | Yes | Yes |
| "BX" | Yes | Yes | Yes |

FIG. 1B
(PRIOR ART)

| BLCAM v1 Input\Stored | Matching? "0" | "1" | "BX" |
|---|---|---|---|
| "0" | Yes | No | Yes |
| "1" | No | Yes | Yes |
| "BB" | No | No | Yes |

FIG. 2A

| BLCAM v2 Input\Stored | Matching? "0" | "1" | "BB" |
|---|---|---|---|
| "0" | Yes | No | No |
| "1" | No | Yes | No |
| "BX" | Yes | Yes | Yes |

FIG. 2B

| BLTCAM Input\Stored | Matching? "0" | "1" | "BX" | "BB" |
|---|---|---|---|---|
| "0" | Yes | No | Yes | No |
| "1" | No | Yes | Yes | No |
| "BX" | Yes | Yes | Yes | Yes |
| "BB" | No | No | Yes | No |

FIG. 2C

| | "f0" is programmed Vt0 Low | "f1" is programmed Vt1 high |
|---|---|---|
| Input "f0" | Vg0>Vt0   Rds0 Low | Vg0<Vt1   Rds0 High |
| Input "f1" | Vg1>Vt0   Rds1 Low | Vg1>Vt1   Rds1 Low |
| | [transistor "f0" with G, D, S] | [transistor "f1" with G, D, S] |

Typ. Rds Low=1kΩ
Typ. Rds high=1MΩ

FIG. 3

| AUTHENTICATION PATTERN# | PATTERN |
|---|---|
| 1 | 0101010101010101010101 |
| 2 | 34 |
| 3 | 67 |

FIG. 10

MULTI-FACTOR AUTHENTICATION USING A COMBINED SECURE PATTERN

CROSS-REFERENCE TO RELATED APPLICATIONS

This application claims the benefit of and priority to U.S. Provisional Patent Application Ser. No. 62/147,244, filed Apr. 14, 2015, and entitled "Content Addressable Memory (BCAM) with Blocking States and Combination of Multiple Secure Authentication Methods," the entirety of which is incorporated herein by reference.

BACKGROUND OF THE INVENTION

The subject matter disclosed herein relates to systems and methods for performing authentication, and more particularly to multi-factor authentication using a combined secure pattern.

Many different types of memory circuits can be used to compare input data (e.g., an input pattern or search data) against stored data (e.g., reference pattern(s) or a table of stored data). One example of such a memory circuit is Content Addressable Memory (CAM). When a CAM determines a match between the input data and the stored data, it returns the address(es) of the matching data. CAMs, which can perform the comparison between the input data and all of its stored data in a single clock cycle, can be used in a variety of applications requiring high speeds, including packet classification and packet forwarding in network routers.

One type of CAM, known as a Binary CAM (BCAM), uses binary data consisting entirely of two states (0s and 1s) for comparing input data to stored data as shown in the exemplary BCAM truth table of FIG. 1A. The BCAM truth table (FIG. 1A) is of an XOR gate (Exclusive OR), wherein the output is "yes" for a match only if both the input state and the stored state are the same. Conversely, the output is a "no" for a mismatch if the input state does not match the stored state.

A Ternary CAM (TCAM) uses data consisting of 0s and 1s as well as a third state known as a "no care" state (or "BX" state) as shown in the exemplary TCAM truth table of FIG. 1B. The TCAM truth table (FIG. 1B) is also of an XOR gate (Exclusive OR), wherein the output is "yes" for a match only if (a) the input state and the stored state are the same, (b) the stored state is a "no care" state (BX) regardless of the input state (0, 1, or BX), or (c) the input state is a "no care" state (BX) regardless of the stored state (0, 1, or BX). Conversely, the output is a "no" for a mismatch if the input state does not match the stored state, except in the case where the input state or the stored state is a "no care" state (BX). In many cases, the input data is a stream of several bits, where each input bit must be compared to a stored bit in a CAM cell to determine if all of the bits match to provide a "yes" output.

Most CAMs are built with static random access memory (SRAM) cells, where a typical CAM consists of two SRAM cells. In the past, a few 2/4T (2 transistors) Flash Negative-AND (NAND) based architectures have been employed for CAMs (e.g., U.S. Pat. Nos. 6,317,349, 7,110,275, 8,634,247). Recently, the concept of a 4T (four transistors) cell was also presented (e.g., U.S. Patent Application Publication No. 2014/0185349 A1). BCAMs and TCAMs have also been reported to be used for searches and, in cryptography, to safely compare authentication patterns with reference patterns stored in the CAM (e.g., U.S. Pat. Nos. 8,780,633, 8,817,541, 8,717,794, and U.S. Patent Application Publication No. 2012/0143554).

In many systems, user authentication is required before accessing secure data or entering a secure area (e.g., using an automated teller machine (ATM) at a financial institution). Recently, certain applications have begun to require multiple authentication factors for user authentication, including (i) information that the user knows, (ii) information that the user physically possesses; and (iii) characteristics of the user. The use of two or more different authentication factors when authenticating a user is referred to as "multi-factor authentication" (and is sometimes referred to as two-factor authentication when only two authentication factors are used or to "multi-function" authentication).

As shown in FIG. 7, in a prior art method 700 of performing multi-factor authentication using three authentication factors represented by three different authentication patterns 701, 702, 703, three sequential authentication (or matching) cycles 711, 712, 713 are performed individually on each authentication pattern 701, 702, 703 to determine if all of the authentication patterns 701, 702, 703 match the stored reference patterns read from memory (e.g., Random Access Memory (RAM)) before authenticating the user 721. If any of the authentication patterns 701, 702, 703 are not proper (i.e., do not match the corresponding reference pattern stored in memory during personalization), the user is not authenticated 722. While the use of multi-factor authentication increases the security of a system, there are still some security concerns. For example, since each authentication factor or authentication pattern 701, 702, 703 is evaluated separately, it is possible for a hacker to determine which of the authentication patterns 701, 702, 703 were successful and which were not when the system does not authenticate a user. In addition, in each of the authentication (or matching) cycles 711, 712, 713, the system reads the individual secure reference patterns stored in memory providing potential access to a hacker.

The discussion above is merely provided for general background information and is not intended to be used as an aid in determining the scope of the claimed subject matter.

BRIEF DESCRIPTION OF THE INVENTION

A method and system for multi-factor authentication is disclosed. The method involves combining a plurality of authentication patterns into a combined secure pattern by inserting one or more spacing states into one authentication pattern at locations based on the values of another authentication pattern.

In one embodiment, a method of multi-factor authentication is disclosed. The method includes the steps of receiving a first authentication pattern, receiving a second authentication pattern, and combining the first authentication pattern and the second authentication pattern into a first combined secure pattern by inserting one or more spacing states into the first authentication pattern at locations based on the values of the second authentication pattern.

In another embodiment, a system for multi-factor authentication is disclosed. The system includes a central processor unit configured to receive a first authentication pattern, receive a second authentication pattern, and combine the first authentication pattern and the second authentication pattern into a first combined secure pattern by inserting one or more spacing states into the first authentication pattern at locations based on the values of the second authentication pattern.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which:

FIGS. 1A and 1B are illustrations of exemplary truth tables for BCAMs and BTCAMs;

FIGS. 2A and 2B are illustrations of exemplary truth tables for two embodiments of BLCAMs;

FIG. 2C is an illustration of an exemplary truth table for BLTCAMs;

FIG. 3 is an illustration of an exemplary NAND Flash-type transistor of a BLCAM/BLTCAM;

FIG. 10 is a table of three exemplary authentication patterns;

DETAILED DESCRIPTION OF THE INVENTION

Figure 4:
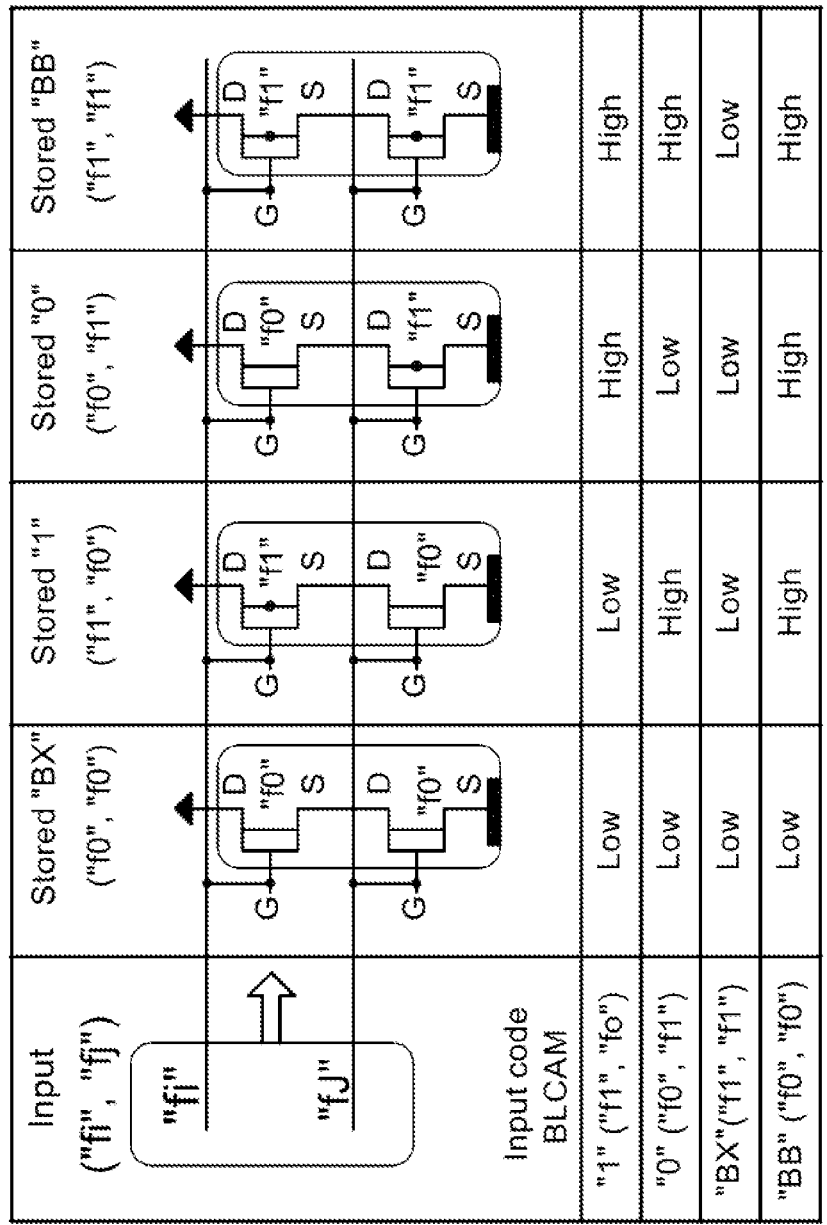
FIG. 4 is a table illustrating the impedance of an exemplary BLCAM/BLTCAM.

In accordance with one embodiment of the invention involving the use of a memory circuit to compare input data against stored data using blocking states (e.g., for user authentication), exemplary non-volatile NAND Flash-type CAM circuits are disclosed. However, it will be understood that other types of memory circuits and manufacturing technologies other than CAM circuits (or NAND Flash-type CAM circuits) can be used to implement the use of blocking states, including NOR Flash, EEPROM, and One-Time Programmable (OTP).

FIGS. 2A and 2B are illustrations of exemplary truth tables for two embodiments of Blocking Content Addressable Memory (BLCAM) circuits. FIG. 2C is an illustration of an exemplary truth table for an embodiment of a Blocking Ternary Content Addressable Memory (BLTCAM) circuit. In addition to the binary states (0s and 1s) and "no care" state (BX), these exemplary truth tables also incorporate a "blocking" state (BB).

The exemplary BLCAM truth tables of FIGS. 2A and 2B superimpose the BCAM truth table shown in FIG. 1A, but with the additional "no care" (BX) and "blocking" (BB) states. In the first exemplary version (v1) of the BLCAM truth table shown in FIG. 2A, the output is "yes" for a match only if (a) the input state and the stored state are the same, or (b) the stored state is a "no care" state (BX) regardless of the input state (0, 1, or BB). Conversely, the output is a "no" for a mismatch if (a) the input state does not match the stored state except in the case where the stored state is a "no care" state (BX), or (b) the input state is a "blocking" state (BB) except in the case where the stored state is a "no care" state (BX). In other words and with respect to situation when the input state is a "blocking" state (BB), the output is a "no" for a mismatch when the stored state is a 0 or a 1.

In the second exemplary version (v2) of the BLCAM truth table shown in FIG. 2B, the output is "yes" for a match only if (a) the input state and the stored state are the same, or (b) the input state is a "no care" state (BX) regardless of the stored state (0, 1, or BB). Conversely, the output is a "no" for a mismatch if (a) the input state does not match the stored state except in the case where the input state is a "no care" state (BX), or (b) the stored state is a "blocking" state (BB) except in the case where the input state is a "no care" state (BX). In other words and with respect to situation when the stored state is a "blocking" state (BB), the output is a "no" for a mismatch when the input state is a 0 or a 1.

The exemplary BLTCAM truth table of FIG. 2C superimposes the TCAM truth table shown in FIG. 1B, but with the additional "blocking" state (BB) at the input and stored stages such that the input and stored stages can have four possible states (0, 1, BX, and BB) using two bit lines. In the exemplary BLTCAM truth table shown in FIG. 2C, the output is "yes" for a match only if (a) the input state and the stored state are the same except if the input state and the stored state are both "blocking" states (BB), or (b) the input state is a "no care" state (BX) regardless of the stored state (0, 1, BX, or BB). Conversely, the output is a "no" for a mismatch if (a) the input state does not match the stored state except in the case where the input state or the stored state is a "no care" state (BX), or (b) the input state or the stored state is a "blocking" state (BB) except in the case where the input state or the stored state is a "no care" state (BX).

As will be discussed, when the output is "yes" for a match, the of the BLCAM/BLTCAM is configured to be in a passing (or conductive) mode (low impedance). But when the output is a "no" for a mismatch, the BLCAM/BLTCAM is configured to be in a blocking (or non-conductive) mode (high impedance).

As can be seen from the truth tables of FIGS. 2A, 2B, and 2C, the 0 and 1 states are symmetrical as they play an opposite role to each other. However, the "no care" state (BX) and the "blocking" state (BB) are asymmetrical, since the output is "yes" for a match when the input state and the stored state are both "no care" states (BX), but the output is a "no" for a mismatch when the input state and the stored state are both "blocking" states (BB). This asymmetry can be employed as a feature to increase security.

FIG. 3 is an illustration of an exemplary non-volatile NAND Flash-type transistor for use in a BLCAM/BLTCAM circuit. It will be understood that while NAND Flash-type transistors are used in the exemplary embodiment, alternative embodiments of the invention can use any type of non-volatile memory transistors having a control gate (G), a source terminal (S), and a drain terminal (D) available for connection as shown in FIG. 3.

The Exemplary BLCAM/BLTCAM cell is based on two non-volatile NAND Flash-type transistors that are connected as described below. To avoid confusion between the depiction of the BLCAM/BLTCAM cells and the underlying NAND Flash-type transistor, the stored 0 (zero) and 1 (one) states of the NAND Flash-type transistor are referred to as "f0" (first) and "f1" (second) transistor states. The read mode and programming mode of the underlying NAND Flash-type transistors as integrated in BLCAM/BLTCAMs are described in FIG. 3. The threshold voltage (Vt0) when the programming is in an "f0" transistor state, is such that the NAND Flash-type transistor is in a passing mode (low impedance and conductive between the drain and the source in the NAND Flash-type transistor) both when the input state is at a low voltage level (Vg0), as well as at a high voltage input level (Vg1). When the programming is in an "f1" transistor state, the NAND Flash-type transistor is in a passing (or conductive) mode when the input state is at a high voltage level (Vg1), and in a blocking mode (high impedance and not conductive between the drain and the source in the NAND Flash-type transistor) when the input state is at a low voltage level (Vg0). In an example, the output impedance of the NAND Flash-type transistor is in the low impedance range (e.g., 100Ω to 1 KΩ) in the passing (or conductive) mode. In another example, the output impedance of the NAND Flash-type transistor is in the high impedance range (1 MΩ or higher) in the blocking mode. Typical input voltages on the control gate of the NAND Flash-type transistor could be approximately 0.8V for Vg0, and approximately 1.8V for Vg1. Since this voltage could vary from one process technology to another, the Vg0 voltage can be set in such a way that a NAND Flash-type transistor programmed in a 0 state ("f0") will enable a passing mode of the NAND Flash-type transistor, while the transistor programmed in a 1 state ("f1") will result in a blocked NAND Flash-type transistor. Vg1 voltage should be high enough to enable a passing mode of the NAND Flash-type transistor with "f0" and 'f1" states. Such transistor structures are also available with NOR Flash, EEPROM, and OTP, among others, and can be the foundation for the design of BLCAM/BLTCAM circuits.

FIG. 4 is a table illustrating the impedance of an exemplary BLTCAM with four BLTCAM cells. An exemplary BLTCAM cell is built out of two non-volatile NAND Flash-type transistors and has two separate bit lines ("fi" and "fj"). The first bit line ("fi") is connected to the control gate (G) of the first NAND Flash-type transistor in each BLTCAM cell, while the second bit line ("fj") is connected to the control gate (G) of the second NAND Flash-type transistor in each BLTCAM cell. The first NAND Flash-type transistor is connected in series with the second NAND Flash-type transistor, with the source of the first NAND Flash-type transistor connected in series with the drain of the second NAND Flash-type transistor. The input state is defined by a pair of bits, and has four states: "1", "0", "BX" (no care), and "BB" (blocking) It will be understood that the relationship between these states of the input stage and the state of underlying NAND Flash-type transistor described in FIG. 3, "f0" or "f1", is arbitrary and has been chosen for illustrative purposes and can be changed. In the exemplary embodiment disclosed herein, the ("f1", "f0") pair is referred to as the "1" state of the input stage of the BLTCAM, the ("f0", "f1") pair is referred to as the "0" state, the ("f1", "f1) is referred to as the "BX" (no care) state, and the ("f0", "f0") is referred to as the "BB" (blocking) state. In order to superimpose the truth table of the BLTCAM (FIG. 2C) with an existing TCAM (FIG. 1B), the arbitrary definition of the four states that the NAND Flash-type transistor can be programmed is slightly different at the storage level: the ("f1", "f1") pair is referred to as the "BB" (blocking) state, the ("f0", "f0") pair is referred to as the "BX" (no care) state, the ("f1", "f0") pair is still referred to as the "1" state, and the ("f0", "f1") pair is referred to as the "0" state. The states chosen here are just an example as the objective is to match the truth table of FIG. 2C for illustrative purposes. In summary, BLTCAMs have four distinct states, both at the input and output stages, while traditional BCAM and TCAM architectures have only 2 and 3 states, respectively. The additional blocking state of the BLTCAM can be exploited in areas including, but not limited to, cryptography.

As shown in FIG. 4, which is illustrative of the exemplary BLTCAM truth table of FIG. 2C, the exemplary BLTCAM cell is in a passing (or conductive) mode (low impedance) for a match only if (a) the input code and the stored code are the same except if the input code and the stored code are both "blocking" states (BB), or (b) the input code is a "no care" state (BX) regardless of the stored code (0, 1, BX, or BB). Conversely, the exemplary BLTCAM cell is in a blocking mode (high impedance) for a match mismatch if (a) the input code does not match the stored code except in the case where the input code or the stored code is a "no care" state (BX), or (b) the input code or the stored state is a "blocking" state (BB) except in the case where the input code or the stored code is a "no care" state (BX).

Figure 5:
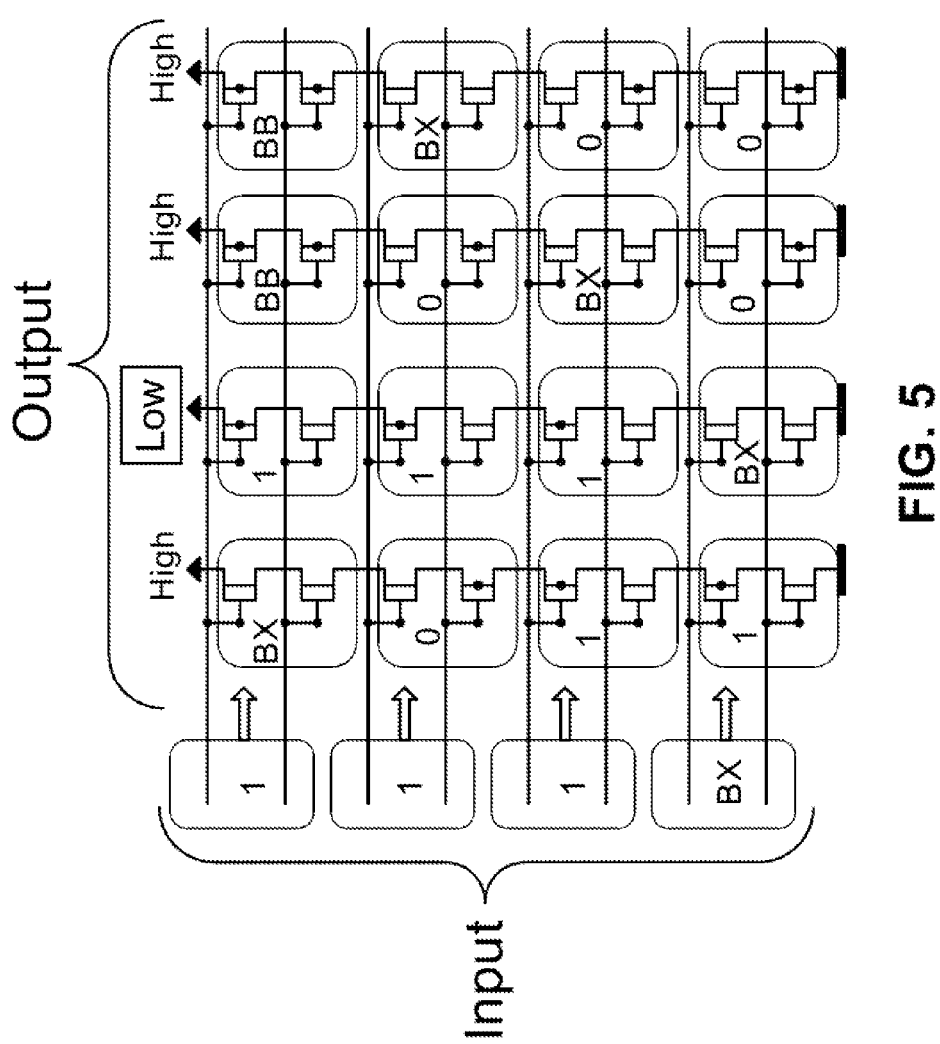
FIG. 5 is an illustration of an exemplary four-state BLCAM/BLTCAM NAND cell.

FIG. 5 is an illustration of an exemplary four-state BLTCAM circuit with an array of sixteen BLTCAM cells for a eight bit input (word or pattern) with four different stored words or patterns (one in each column). An discussed above, the exemplary BLTCAM cell is built out of two non-volatile NAND Flash-type transistors and has two separate bit lines. The first bit line is connected to the control gate of the first NAND Flash-type transistor in each BLTCAM cell, while the second bit line is connected to the control gate (G) of the second NAND Flash-type transistor in each BLTCAM cell. Multiple BLTCAM cells can be connected in series to form longer NAND chains storing strings of 0s, 1s, BXs, and BBs for the four possible states, as shown in FIG. 5. For example, in applications where cryptographic keys are stored, as much as 1 kbit chains can be stored. If only one NAND Flash-type transistor has high impedance in blocking mode, the entire chain will have a high impedance creating blocking. The NAND chain has low impedance in a passing mode when the pattern in the input stage matches the pattern stored in the chain creating a passing or conductive chain. Additional input patterns replacing a "0" or a "1" by a "BX" will also result in an output stage in a passing mode (Low impedance), as "BX" represents the "no care" state. However if a wrong state ("0" or "1") is present at the wrong location of the chain creating a mismatch, the entire chain will be in a blocking mode (high impedance). "BB" (blocking) in the input pattern will only result in a passing mode (low impedance) output if a "BX" (no care) is stored at the matching location.

As shown in FIG. 5, it is possible to design an array of multiple NAND chains sharing the same input lines, also called bit lines. In this case, is it possible to test these multiple chains concurrently. For example, these NAND chains can be arranged in parallel columns storing strings of 0s, 1s, BXs, and BBs for the four possible states. In the example illustrated in FIG. 5, only the second chain has a low output impedance (passing mode) resulting from a matching input code and the stored code, while the remaining three chains have high impedance (blocking mode) resulting from a mismatch between the input code and the stored code. Such a configuration can be widely implemented in routers, as well as look up tables with triggering dispatching capabilities.

Figure 6:
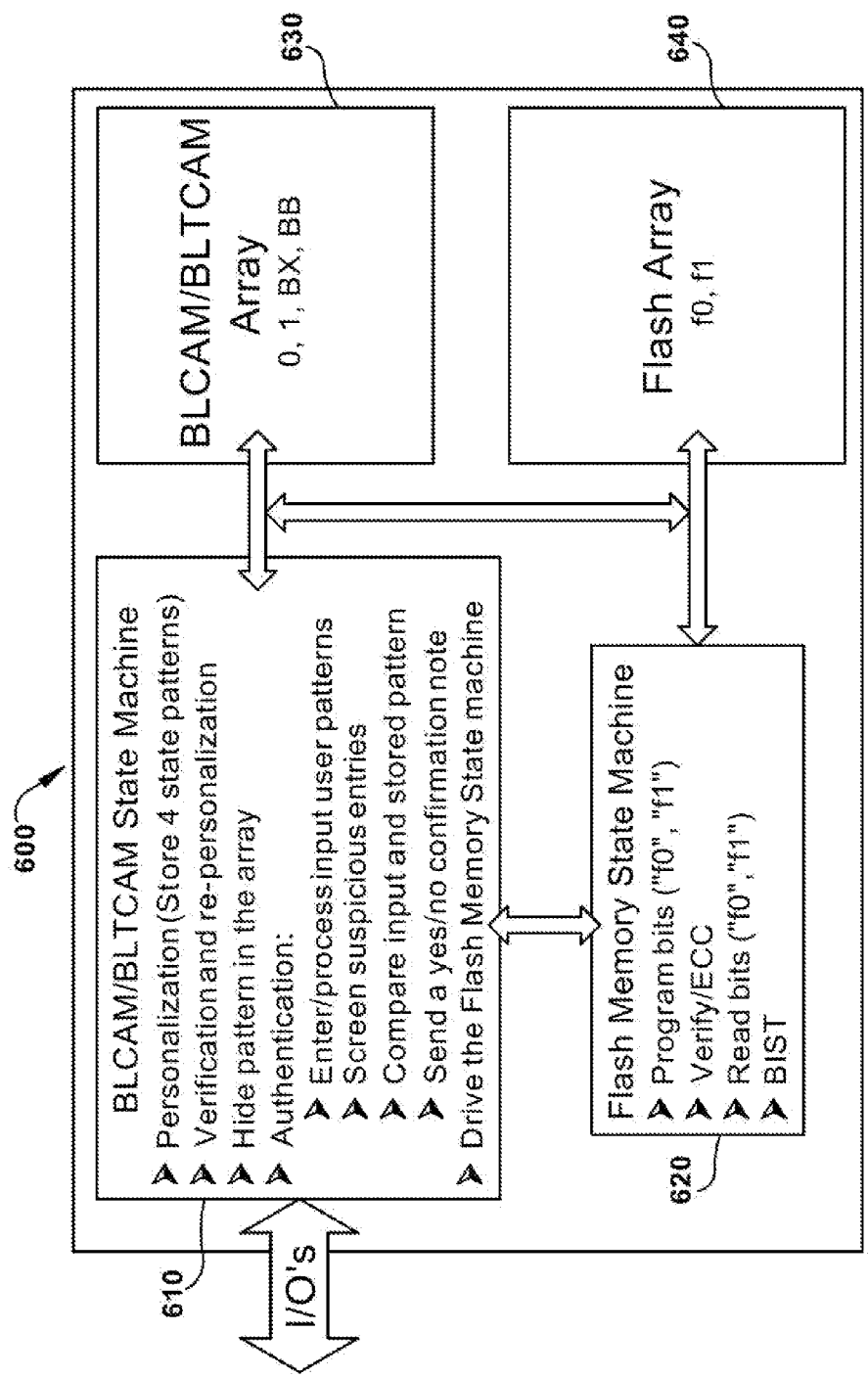
FIG. 6 is a block diagram of an exemplary BLCAM/BLTCAM state machine.

FIG. 6 is a block diagram of an exemplary state machine 600 that includes a BLCAM/BLTCAM state machine 610 and a Flash Memory state machine 620. The exemplary state machine drives basic functions of a memory device, including, but not limited to, programming the BLCAM/BLTCAM array 630 and Flash Array 640, verifying and correcting the content as needed, and reading the stored information. The exemplary state machine 600 reuses the standard blocks of a NAND flash state machine and performs additional tasks, including, but not limited to the following examples.

For example, the state machine 600 performs personalization, downloading strings of information that include "zeros", "ones", "no cares", and "blocking" states. When identity keys are downloaded in a secure memory, patterns are stored in the arrays 630, 640. The state machine 600 can be programmed to perform operations that enhance security during this cycle, including, but not limited to, burying (or hiding) the secure patterns within the arrays 630, 640, preventing hackers from easily extracting these patterns in the unlikely event that a hacker was able to read the overall content of the arrays 630, 640.

In another example, the state machine 600 performs verification and validation of the data integrity. The state machine 600 verifies the integrity of the data stored in memory, test its reliability, and, if necessary, reprograms and corrects the content. If part of the arrays 630, 640 has defects, the state machine 600 can find the portion of the arrays 630, 640 suitable for the download or send a message back to the operator that part of the arrays 630, 640 is defective. Such operations are sometimes referred as Build In Self-Test (BIST).

Further, the state machine 600 performs authentication. The state machine 600 verifies that strings of information were correctly downloaded and corrects the strings as necessary or sends a message to reject a part of the strings that is defective. These actions can be performed without reading and exposing the strings stored in the BLCAM/BLTCAM. During the authentication process, a user reference pattern is provided by the crypto-processor to the state machine 600. The state machine 600 can compare this pattern with the pattern stored in the arrays 630, 640, and send a message back in the event of a match. The state machine can perform additional tasks to enhance security, including, but not limited to, blocking repetitive negative authentications, inserting additional "dummy" patterns above and beyond the input pattern to be sure that parallel unwelcomed attacks are not occurring, and blocking input patterns that have excessive number of "no care" (BX) states. The "no cares" (BX) will match with any stored patterns, so the state machine can limit how many "no care" (BX) states are allowed, and block the authentication process when excessive numbers of (BX) states are involved.

In another example, the state machine 600 tracks the asymmetry between the "no care" state (BX) and the "blocking" state (BB). When the "blocking" state (BB) is downloaded in the BLCAM/BLTCAM, only a "no care" state (BX) can result in a match during authentication. Accordingly, the state machine 600 can convert the "blocking" state (BB) into a "no care" state (BX) during the authentication process following the second exemplary version (v2) of the BLCAM truth table shown in FIG. 2B. On the other hand, the state machine 600 can follow first exemplary version (v1) of the BLCAM truth table shown in FIG. 2A, and store "no care" states (BX) instead of "blocking" states (BB). The authentication process will then handle "0" states, "1" states and "blocking" states (BB). It should also be noted that the definition of the "blocking" state (BB) and the "no care" state (BX) at the flash level is the opposite in the stored stage versus the input stage. These definitions are arbitrary, and can be reversed.

Further, the state machine 600 can perform basic NAND flash functionality. Considering that BLCAM/BLTCAMs are based on NAND flash, the state machine can manage part of the arrays 630, 640 as a regular NAND and/or NOR flash, while reserving a portion of the arrays 630, 640 for BLCAM/BLTCAM type usage. Considering the prominent legacy of existing flash memory technology systems, this will allow the reuse of existing solutions in addition to the solutions provided by a BLCAM/BLTCAM.

Additionally, the state machine 600 is capable of storage of four states & traditional read. The state machine can also support a mode where the BLCAM/BLTCAM stores "0"s, "1"s, "BX", and "BB" cycles during the personalization cycle, but works as a traditional memory to simply read the content of the BLCAM/BLTCAM instead of using a matching cycle. The authentication cycle will then be performed in a way that is similar to a regular flash memory. This method is less secure because a crypto-analyst might find a way to extract the stored pattern during a read cycle. However, this method will be compatible with legacy software and architectures. Commonly used crypto-analysis methods to extract the content during a read cycle include Differential Power Analysis (DPA) and electromagnetic interference (EMI) detection.

A single chip can be designed to have a state machine 600 that can control an integrated flash array 640 in addition to a BLCAM/BLTCAM. The BLCAM/BLTCAM is back-compatible with an existing CAM. The truth table is exactly identical when zeros and ones area involved, as the logic describing the product is an exclusive OR, also referred to as XOR. Additionally, the BLTCAM is back-compatible with an existing TCAM. The truth table is identical when zeros, ones, and no cares are involved. The no care states create a yes in the step of matching yes or no when inserted in the input stage or the storage state of the TCAM.

The BLCAM/BLTCAM architecture described herein includes several advantages compared to traditional CAM (BCAM and TCAM) architectures. The BLCAM/BLTCAMs are simpler and cheaper to manufacture than the NAND CAMs based on only two NAND Flash-type transistor per cell. In addition, the size of the elementary BLCAM/BLTCAM cell is only twice as large as the cell size of NAND Flash-type. For example, the BLCAM/BLTCAM will be 8F2 if 4F2 is the cell size of the NAND flash technology that has been selected to design the BLCAM/BLTCAM, where F is the dimension of the technology node of the semiconductor process technology. This is smaller than a NAND TCAM, and requires no changes in the flash technology to design the new product. Small cell size means that the BLCAM/BLTCAM will be small, and that many parts can be produced out of a silicon wafer, keeping the cost low. When implemented with EEPROM, the cell size of the BLCAM/BLTCAM will be equal to two EEPROM cells.

Additionally, the BLCAM/BLTCAMs enhance the level of security during authentication. Unlike traditional Flash or EEPROM-based secure chip processors, also referred to as secure elements, smartcards, or secure storage, that usually expose the internally stored reference pattern during the authentication process, BLCAM/BLTCAM can be set to never read what is stored in memory. Most of the time, a BLCAM/BLTCAM is operating as a CAM, where the processing element simply compares at once the entire user pattern with the stored reference pattern in one machine cycle and determines if the two patterns match or not, resulting in a "yes" when the patterns match, and a "no" when they do not. In case of a mismatch, the BLCAM/BLTCAM does not disclose any information other than the fact that the pattern that has been provided by the user during authentication is not compatible with the reference pattern stored. A BLCAM/BLTCAM has blocking states that can be used to intentionally confuse the matching process and to confuse the cryptanalyst. Hackers that master crypto-analysis methods, including, but not limited to, differential power analysis (DPA) to extract the stored pattern of traditional secure chip processors during authentication cycle will have a harder time learning from a BLCAM/BLTCAM.

An additional advantage of the BLCAM/BLTCAM architecture is that BLCAM/BLTCAMs for applications, including, but not limited to, secure elements, smartcards, payment cards, access cards, or smart passports, are as convenient to use as flash or EEPROM based systems for the general public. During the personalization process, usually done by the service provider, the integrated patterns or "Message Authentication Codes" (MACs) are loaded into the BLCAM/BLTCAM secure element in a similar way as existing secure elements. Accordingly, users simply enter their identification codes as required by existing systems to successfully authenticate themselves, and gain access to the service.

Further, BLCAM/BLTCAMs include back compatibility and thus have an expanded usage. Since the BLCAM/BLTCAM technology is based on traditional flash technology, it is possible to create a chip with a portion of the chip being a flash memory. The BLCAM/BLTCAM can be implemented for applications other than chip security applications.

Figure 7:
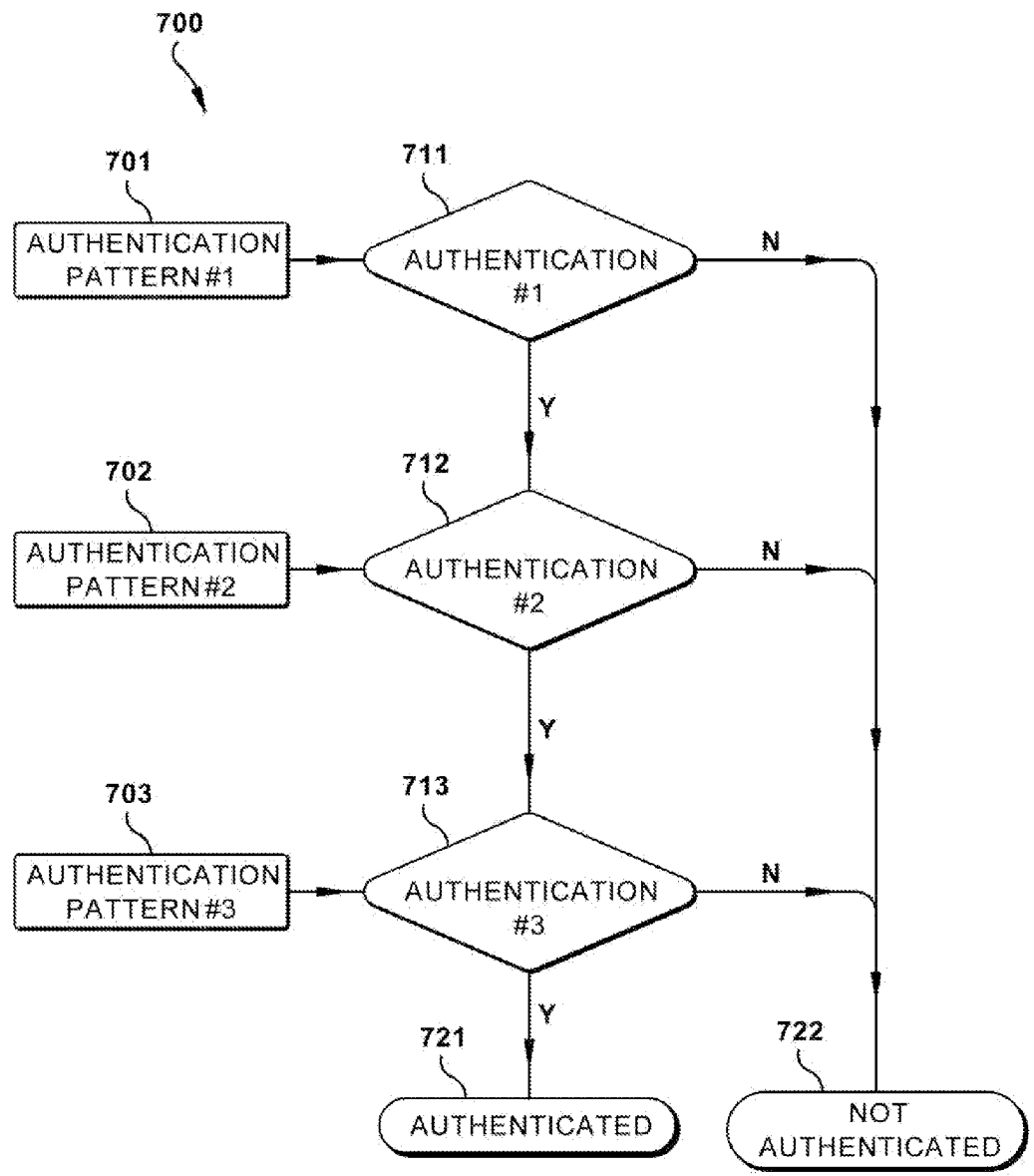
FIG. 7 is a flow diagram of a prior art method for multi-factor authentication.

As discussed above, certain applications require multiple authentication factors for user authentication. The use of two or more different authentication factors when authenticating a user is referred to as "multi-factor authentication" (and is sometimes referred to as two-factor authentication when only two authentication factors are used). As also discussed above and as shown in FIG. 7, in existing multi-factor authentication systems, since each authentication factor or authentication pattern 701, 702, 703 (e.g., bit streams, words, etc.) is evaluated separately, it is possible for a hacker to determine which of the authentication patterns 701, 702, 703 were successful and which were not when the system does not authenticate a user. In addition, in each of the authentication (or matching) cycles 711, 712, 713, the system reads the individual secure reference patterns from memory (e.g., RAM) providing potential access to a hacker.

As used herein, the terms "strings," "patterns," and "keys" with respect to authentication are synonymous.

Figure 8:
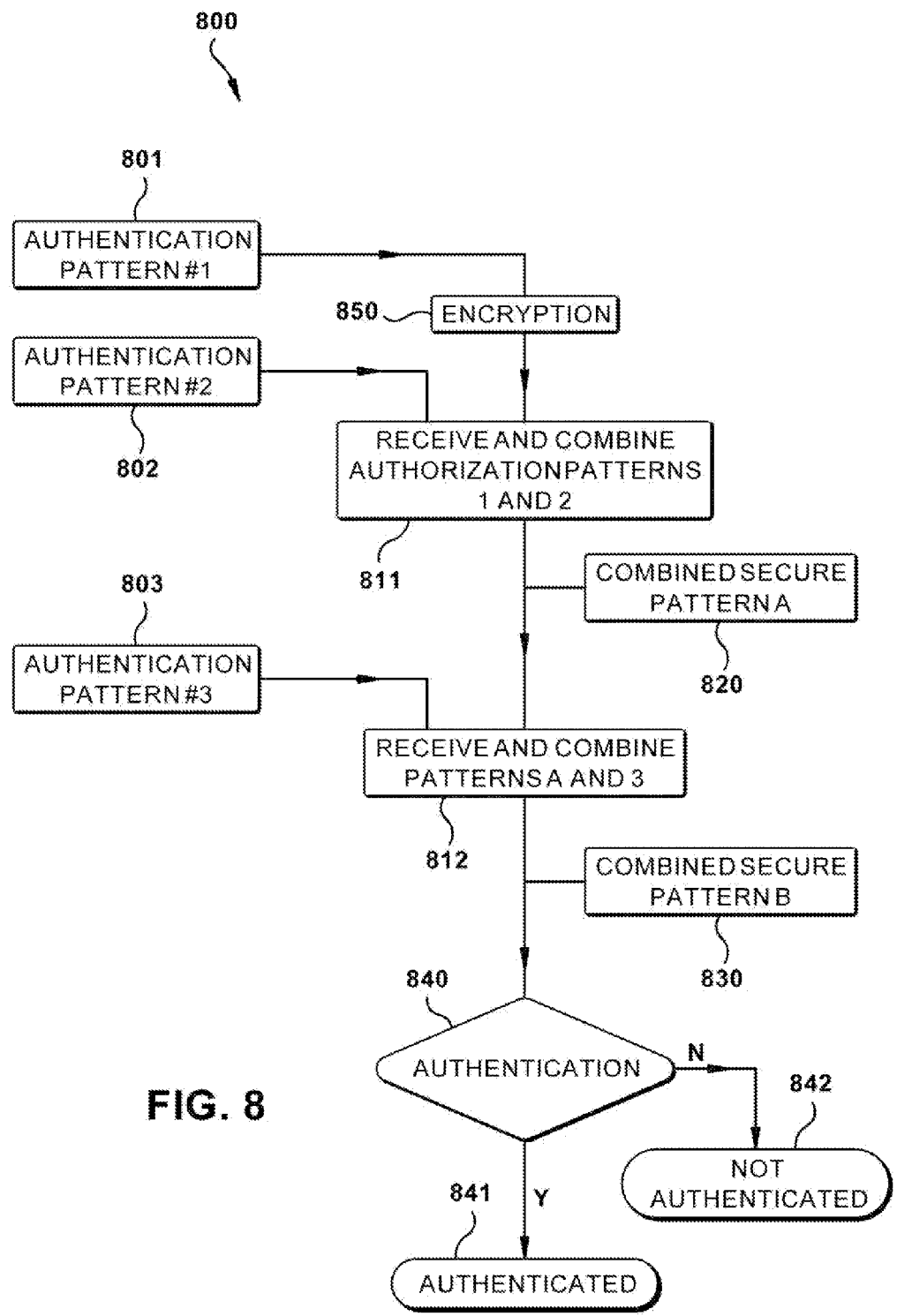
FIG. 8 is a flow diagram of an exemplary method for multi-factor authentication using a combined secure pattern based on three authentication patterns.
Figure 9:
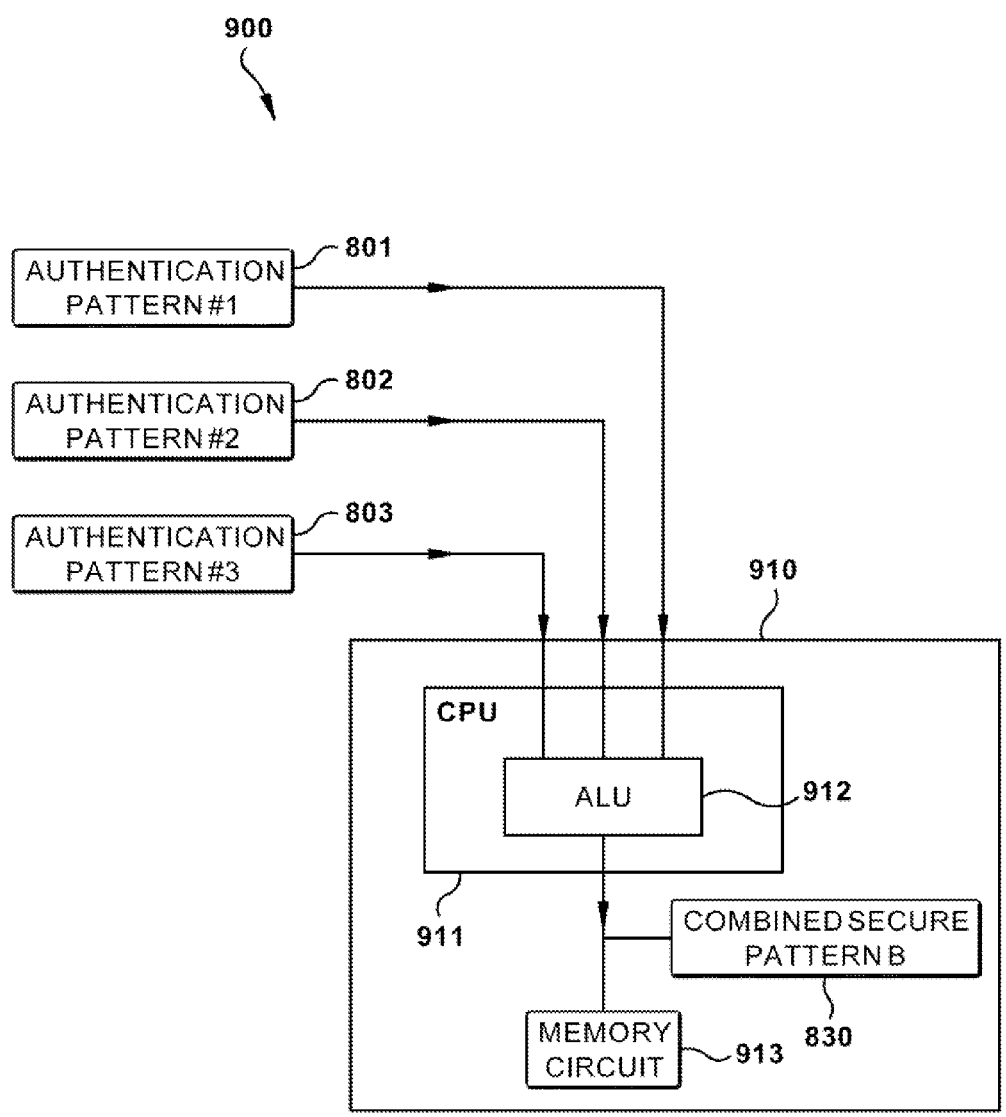
FIG. 9 is a block diagram of an exemplary system for multi-factor authentication using a combined secure pattern based on three authentication patterns as shown in the method of FIG. 8.

FIG. 8 is a flow diagram of an exemplary method 800 for multi-factor authentication using a combined secure pattern (B) 830 based on three authentication patterns 801, 802, 803. FIG. 9 is a block diagram of an exemplary system 900 for multi-factor authentication using a combined secure pattern (B) 830 based on three authentication patterns 801, 802, 803 as shown in the method 800 of FIG. 8. The method 800 can be referred to as an "edit spacing" method or "edit distance" method, which can make crypto-analysis more confusing and difficult.

Returning to FIG. 8, the first authentication pattern 801 and the second authentication pattern 802 are received and combined 811 into a first combined secure pattern (A) 820. In one embodiment, the first authentication pattern 801 (or any of the authentication patterns 801, 802, 803) can be encrypted 850 before being received and combined 811 into a first combined secure pattern (A) 820. The combination of the multiple authentication patterns 801, 802, 803 that are combined into the combined secured pattern (B) 830 can be encrypted prior to the combination, during the combination, or after the combination, as long as the personalization process is following the same method as the authentication process.

As shown in FIG. 9, in one embodiment, the first authentication pattern 801 and the second authentication pattern 802 are received by an arithmetic logical unit (ALU) 912 of the central processor unit (CPU) 911 of a secure element 910 (e.g., ARM Cortex-A57 Processor that can be part of a smartphone). As will be explained below, in one embodiment, the ALU 911 combines the first authentication pattern 801 and the second authentication pattern 802 into a first combined secure pattern (A) 820, which is based on the first authentication pattern 801 and the second authentication pattern 802. As seen in FIG. 8, the third authentication pattern 803 and the first combined secure pattern (A) 820 are received and combined 812 into a second combined secure pattern (B) 830. As shown in FIG. 9, in one embodiment, the third authentication pattern 803 is received by the ALU 912 of the CPU 911 of a secure element 910). As will be explained below, in one embodiment, the ALU 911 combines the third authentication pattern 803 and the first combined secure pattern (A) 820 into a second combined secure pattern (B) 830, which is based on the third authentication pattern 803 and the first combined secure pattern (A) 820.

With reference to FIG. 8, in one embodiment, the step 811 of combining the first authentication pattern 801 and the second authentication pattern 802 to create the first combined secure pattern (A) 820 includes inserting spacing states (e.g., "no care" state (BX), "blocking" (BB) state, "0" state, "1" state) into the first authentication pattern 801 at locations based on the values of second authentication pattern 802 to create a combined stream of bits from the first authentication pattern 801 and spacing states based on the second authentication pattern 802. Similarly, in one embodiment, the step 812 of combining the first combined secure pattern (A) 820 and the third authentication pattern 803 to create the second combined secure pattern (B) 830 includes inserting spacing states (e.g., "no care" state (BX), "blocking" (BB) state, "0" state, "1" state) into the first combined secure pattern (A) 820 at locations based on the values of the third authentication pattern 803 to create a combined stream of bits from the first combined secure pattern (A) 820 and spacing states based on the third authentication pattern 803.

In an authentication (or matching) cycle 840, this combined secure pattern (B) 830 (or "giant key" or "mega-key") is then compared to a reference pattern that was stored in memory during personalization. As shown in FIG. 9, in one embodiment, the combined secure pattern (B) 830 is compared to a reference pattern using a memory circuit 913. If the memory circuit 913 is, e.g., a CAM, BLCAM, or BLTCAM, the reference pattern need not be read from memory and is therefore not exposed to a hacker. As shown in FIG. 8, if the combined secure pattern (B) 830 matches the stored reference pattern, the user is authenticated 841. If the combined secure pattern (B) 830 does not match the reference pattern, the user is not authenticated 842.

The method of multi-factor authentication described above in the exemplary system 900 (FIG. 9) is extremely secure because the stored reference pattern is not extracted during the authentication (or matching) cycle if the memory circuit 913 is, e.g., a CAM, BLCAM, or BLTCAM. However, as described above with respect to storage of four states and traditional read, it is possible to authenticate the user with a traditional read and compare cycle, currently implemented in secure flash based systems. A benefit to using a traditional read and compare cycle is the ability to reuse legacy architectures. Such a hybrid authentication methodology is able to take advantage of a four state BLCAM/BLTCAM, and the possibility to create combined secure patterns out of multiple authentication patterns.

It will be understood that, while the exemplary method 800 (FIG. 8) and system 900 (FIG. 9) for multi-factor authentication is shown using three authentication patterns 801, 802, 803, the combined secure pattern (B) 830 can be based on two or more authentication patterns. Additionally, it will be understood that the combined secured pattern (B) 830 based on three or more authentication patterns can be created in stages (one at a time as shown FIG. 8) or simultaneously (i.e., all three authentication patterns combined together at once). It will also be understood that the method 800 can be implemented for applications other than security applications.

The method 800 can be applied to combine multiple authentication patterns to create longer combined secure patterns. In some cases, dozens of authentication patterns can be combined to into a combined secure pattern to strengthen security. The method 800 can be iterated to add multiple authentication patterns and further increase the size of the combined secure pattern. These exemplary authentication patterns include (i) information that the user knows (e.g., a password, personal identification number (PIN), etc.), (ii) information that the user physically possesses (e.g., digital key, smart card, security fob, hardware or virtual token, USB dongle, digital certificate, mobile device, physical unclonnable functions (PUF), etc.); and (iii) characteristics of the user (e.g., biometric prints such as finger, voice, face, eye or iris, fluid, DNA print, and heart beat signal recognition, etc.). The authentication patterns can also include MACs, multiple public keys and private keys to be inserted at different phases of the securitizing process, and random computer generated codes, among others. In addition, the methods described herein can include the utilization of existing and further cryptographic methods, including but not limited to, Data Encryption Standard (DES), Rivest-Shamir-Adleman cryptosystem (RSA), and Advanced Encryption Standard (AES). While the exemplary combined secure patterns shown in the figures involve the use of spacing states when combining authentication patterns, in other embodiments, the combinations can be done in other ways (e.g., without spacing states).

FIG. 10 is a table of three exemplary authentication patterns. The first authentication pattern 801 (01010101010101010101) is a stream of bits, comprising zeros and ones. The exemplary 20-bit authentication pattern 801, chosen for illustrative purposes and simplicity to illustrate the exemplary method 800, can be, e.g., a digital key from a smart card used at an ATM at a bank. The second authentication pattern 802 (34) is a stream of single digit numbers. The exemplary 2-bit authentication pattern 802, also chosen for illustrative purposes and simplicity to illustrate the exemplary method 800, can be, e.g., a PIN code entered at the ATM after insertion of the smart card. The third authentication pattern 803 (67) is also a stream of single digit numbers. The exemplary 2-bit authentication pattern 803, also chosen for illustrative purposes and simplicity to illustrate the exemplary method 800, can be, e.g., a PUF associated with the ATM. It will be understood that the exemplary authentication patterns 801, 802, 803 totaling 24 bits would typically be much longer streams of bits, but have been shortened for illustrative purposes and simplicity to illustrate the exemplary method 800.

As described above with reference to FIG. 8, in one embodiment, the step of combining patterns to create a combined secure patterns includes inserting spacing states (e.g., "no care" state (BX), "blocking" (BB) state, "0" state, "1" state) into a first pattern at locations based on the values of second pattern to create a combined stream of bits from the first pattern and spacing states based on the second pattern.

Figure 11:
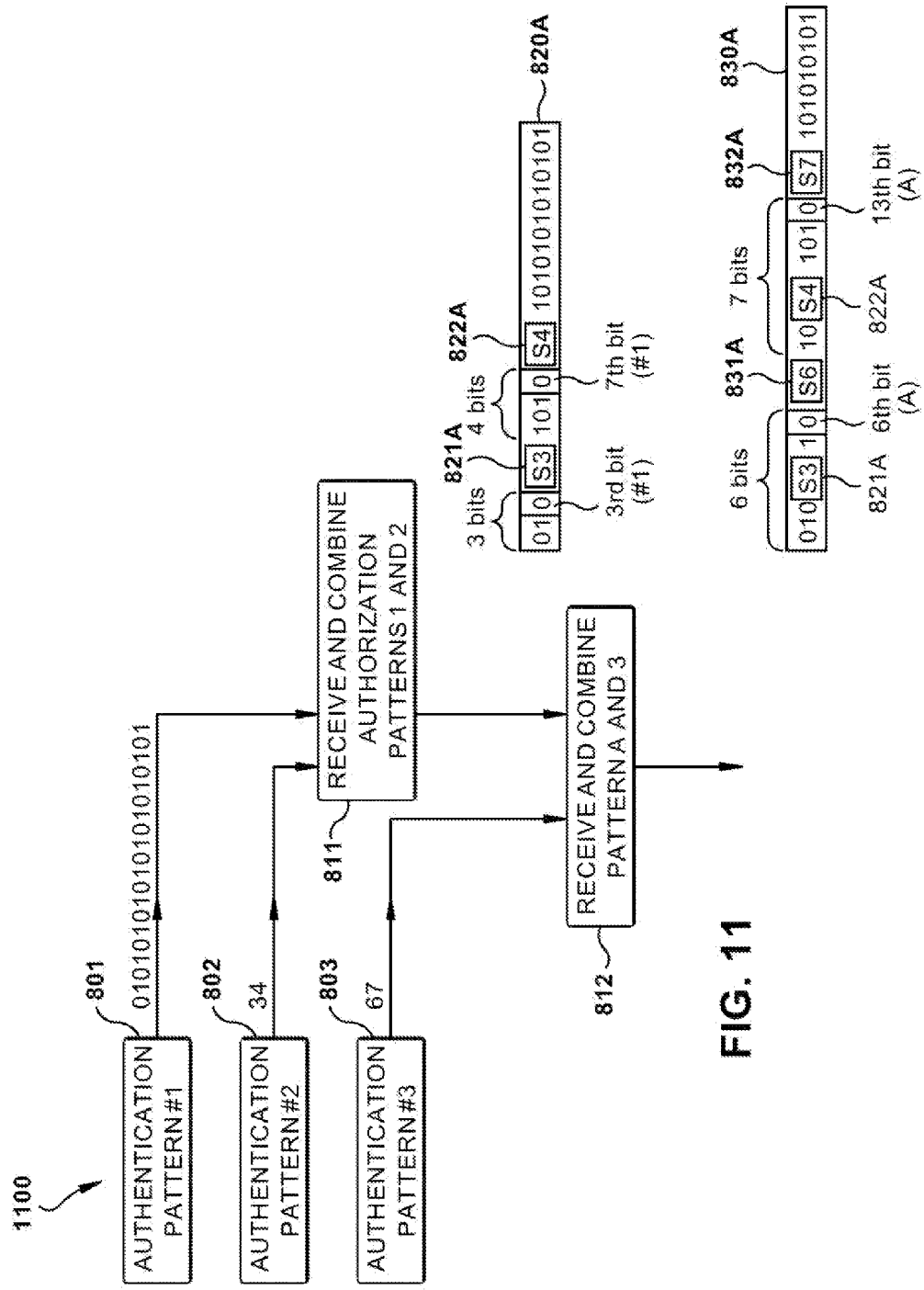
FIG. 11 is a flow diagram of an exemplary method for multi-factor authentication using a combined secure pattern based on three authentication patterns using an exemplary stacking method.

FIG. 11 is a flow diagram of an exemplary method 1100 for multi-factor authentication using a combined secure pattern (B) 830A based on three authentication patterns 801, 802, 803 using an exemplary stacking method 1100. As will be explained, in the exemplary stacking method 1100, the distance between inserted spacing states is stacked. For example, if the two first digits of the second pattern are "3" and "4," the first spacing state is located after the third bit of the first pattern, and the second spacing state is located after the seventh bit (3+4=7) of the first pattern.

As seen in FIG. 11, the first authentication pattern 801 (01010101010101010101) and the second authentication pattern 802 (34) are received and combined into a first combined secure pattern (A) 820A. The step 811 of combining the first authentication pattern 801 and the second authentication pattern 802 to create the first combined secure pattern (A) 820A includes inserting spacing states ("S3" 821A, "S4" 822A) into the first authentication pattern 801 at locations based on the values ("3" in the first digit and "4" in the second digit) of the second authentication pattern 802 to create a combined stream of bits from the first authentication pattern 801 and spacing states based on the second authentication pattern 802. In this exemplary stacking method 1100, the first spacing state ("S3" 821A) is placed into the first authentication pattern 801 at a distance equal to the first digit ("3") of the second authentication pattern 802 from the beginning of first authentication pattern 801. Accordingly, the first spacing state ("S3" 821A) is placed into the first authentication pattern 801 after the third bit of the first authentication pattern 801. The second spacing state ("S4" 822A) is placed into the first authentication pattern 801 at a distance equal to the second digit ("4") of the second authentication pattern 802 from the first spacing state ("S3" 821A). Accordingly, the second spacing state ("S4" 822A) is placed into the first authentication pattern 801 after the seventh bit (3+4=7) of the first authentication pattern 801. For a longer second authentication pattern, subsequent spacing states are placed one at a time into the first authentication pattern 801 at distances equal to the values of the subsequent digits of the numbers of the second authentication pattern 802 until all the numbers of the second authentication pattern 802 are accounted for. This method 1100 assumes that the first authentication pattern 801 is long enough to leave room for all of the spacing states to be inserted into the first authentication pattern 801 at locations based on the values of the second authentication pattern 802 to create the first combined secure pattern (A) 820A.

As seen in FIG. 11, the first combined secure pattern (A) 820A and the third authentication pattern 803 (67) are received and combined into a second combined secure pattern (B) 830A. The step 812 of combining the first combined secure pattern (A) 820A and the third authentication pattern 803 to create the second combined secure pattern (B) 830A includes inserting spacing states ("S6" 831A, "S7" 832A) into the first combined secure pattern (A) 820A at locations based on the values ("6" in the first digit and "7" in the second digit) of the third authentication pattern 803 to create a combined stream of bits from the first combined secure pattern (A) 820A and spacing states based on the third authentication pattern 803. In this exemplary stacking method 1100, the first spacing state ("S6" 831A) is placed into the first combined secure pattern (A) 820A at a distance equal to the first digit ("6") of the third authentication pattern 803 from the beginning of first combined secure pattern (A) 820A. Accordingly, the first spacing state ("S6" 831A) is placed into the first combined secure pattern (A) 820A after the sixth bit of the first combined secure pattern (A) 820A. The second spacing state ("S7" 832A) is placed into the first combined secure pattern (A) 820A at a distance equal to the second digit ("7") of the third authentication pattern 803 from the first spacing state ("S6" 831A). Accordingly, the second spacing state ("S7" 832A) is placed into the first combined secure pattern (A) 820A after the thirteenth bit (6+7=13) of the first combined secure pattern (A) 820A. For a longer second authentication pattern, subsequent spacing states are placed one at a time into the first combined secure pattern (A) 820A at distances equal to the values of the subsequent digits of the numbers of the third authentication pattern 803 until all the numbers of the third authentication pattern 803 are accounted for. This method 1100 assumes that the first combined secure pattern (A) 820A is long enough to leave room for all of the spacing states to be inserted into the first combined secure pattern (A) 820A at locations based on the values of the third authentication pattern 803 to create the second combined secure pattern (B) 830A.

Figure 12:
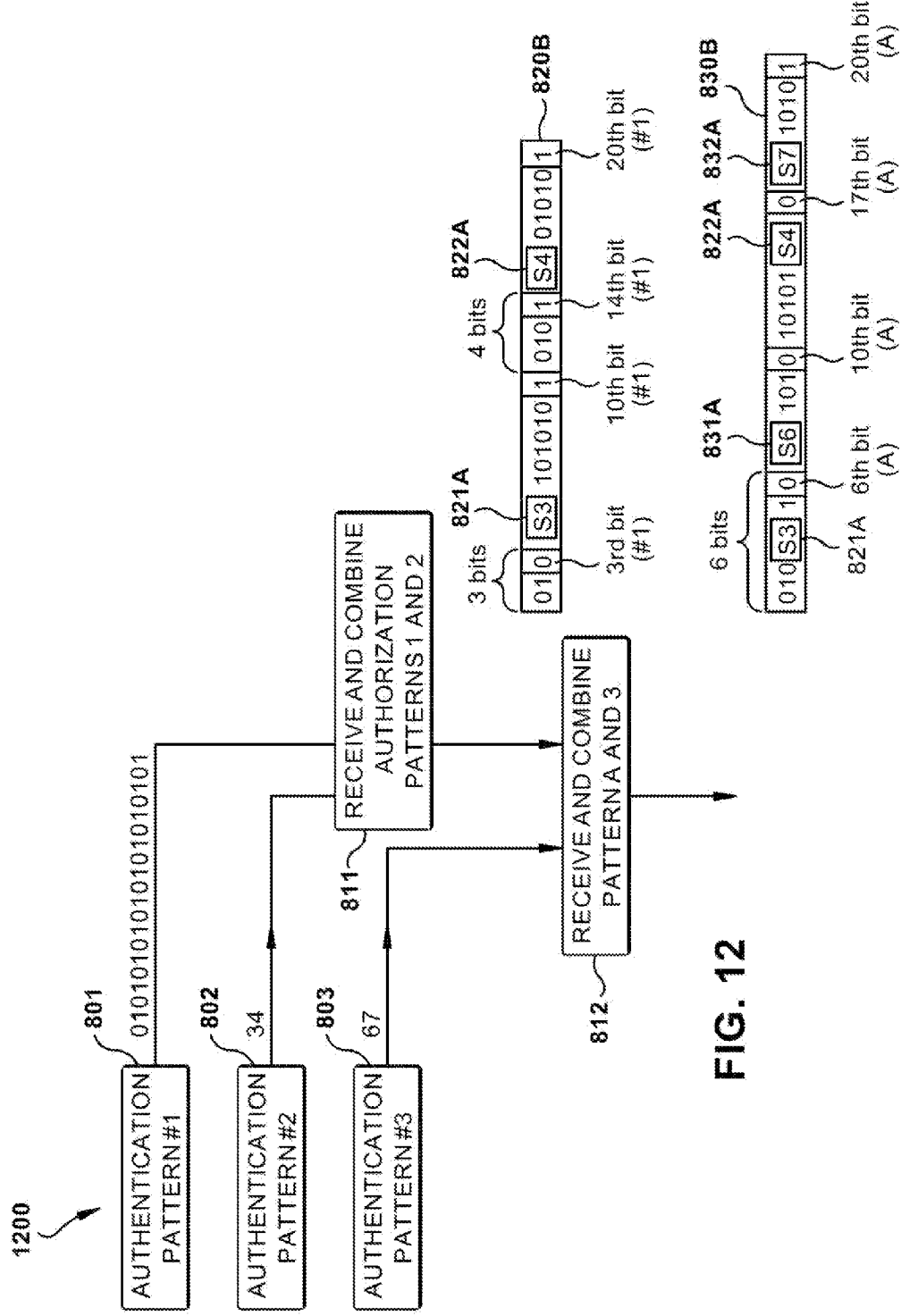
FIG. 12 is a flow diagram of an exemplary method for multi-factor authentication using a combined secure pattern based on three authentication patterns using an exemplary spacing method.

FIG. 12 is a flow diagram of an exemplary method 1200 for multi-factor authentication using a combined secure pattern (B) 830B based on three authentication patterns 801, 802, 803 using an exemplary spacing method 1200. As will be explained, in the exemplary spacing method 1200, the spacing states are inserted into specific ranges of bits (1-10, 11-20, etc.) at locations based on the value of the digits in the second pattern. For example, if the two first digits of the second authentication pattern are "3" and "4," the first spacing state is located after the third bit in the first range (1-10) of bits of the first pattern, and the second spacing state is located after the fourteenth bit in the second range (11-20) of bits of the first pattern.

As seen in FIG. 12, the first authentication pattern 801 (0101010101010101010101) and the second authentication pattern 802 (34) are received and combined into a first combined secure pattern (A) 820B. The step 811 of combining the first authentication pattern 801 and the second authentication pattern 802 to create the first combined secure pattern (A) 820B includes inserting spacing states ("S3" 821A, "S4" 822A) into the first authentication pattern 801 at locations based on the values ("3" in the first digit and "4" in the second digit) of the second authentication pattern 802 to create a combined stream of bits from the first authentication pattern 801 and spacing states based on the second authentication pattern 802. In this exemplary spacing method 1200, the first spacing state ("S3" 821A) is placed into the first range (bits 1-10) of the first authentication pattern 801 at a distance equal to the first digit ("3") of the second authentication pattern 802 from the beginning of first range (bits 1-10) of the first authentication pattern 801. Accordingly, the first spacing state ("S3" 821A) is placed into the first authentication pattern 801 after the third bit of the first authentication pattern 801. The second spacing state ("S4" 822A) is placed into the first authentication pattern 801 at a distance equal to the second digit ("4") of the second authentication pattern 802 from the beginning of second range (bits 11-20) of the first authentication pattern 801. Accordingly, the second spacing state ("S4" 822A) is placed into the first authentication pattern 801 after the fourteenth bit (10+4=14) of the first authentication pattern 801. For a longer second authentication pattern, subsequent spacing states are placed one at a time into the first authentication pattern 801 into subsequent ranges of bits (21-30, 31-40, etc.) at distances equal to the values of the subsequent digits of the numbers of the second authentication pattern 802 until all the numbers of the second authentication pattern 802 are accounted for. This method 1200 assumes that the first authentication pattern 801 is long enough to leave room for all of the spacing states to be inserted into the first authentication pattern 801 at locations based on the values of the second authentication pattern 802 to create the first combined secure pattern (A) 820B.

As seen in FIG. 12, the first combined secure pattern (A) 820B and the third authentication pattern 803 (67) are received and combined into a second combined secure pattern (B) 830B. The step 812 of combining the first combined secure pattern (A) 820B and the third authentication pattern 803 to create the second combined secure pattern (B) 830B includes inserting spacing states ("S6" 831A, "S7" 832A) into the first combined secure pattern (A) 820B at locations based on the values ("6" in the first digit and "7" in the second digit) of the third authentication pattern 803 to create a combined stream of bits from the first combined secure pattern (A) 820B and spacing states based on the third authentication pattern 803. In this exemplary spacing method 1200, the first spacing state ("S6" 831A) is placed into the first range (bits 1-10) the first combined secure pattern (A) 820B at a distance equal to the first digit ("6") of the third authentication pattern 803 from the beginning of first combined secure pattern (A) 820B. Accordingly, the first spacing state ("S6" 831A) is placed into the first combined secure pattern (A) 820B after the sixth bit of the first combined secure pattern (A) 820B. The second spacing state ("S7" 832A) is placed into the first combined secure pattern (A) 820B at a distance equal to the second digit ("7") of the third authentication pattern 803 from the beginning of second range (bits 11-20) of the. Accordingly, the second spacing state ("S7" 832A) is placed into the first combined secure pattern (A) 820B after the seventeenth bit (10+7=17) of the first combined secure pattern (A) 820B. For a longer second authentication pattern, subsequent spacing states are placed one at a time into the first combined secure pattern (A) 820B into subsequent ranges of bits (21-30, 31-40, etc.) at distances equal to the values of the subsequent digits of the numbers of the third authentication pattern 803 until all the numbers of the third authentication pattern 803 are accounted for. This method 1200 assumes that the first combined secure pattern (A) 820B is long enough to leave room for all of the spacing states to be inserted into the first combined secure pattern (A) 820B at locations based on the values of the third authentication pattern 803 to create the second combined secure pattern 830B.

It will be understood that the examples illustrated by FIGS. 11 and 12 only two examples, and there are a variety of ways to create a combined secure pattern. For example, in these examples, illustrated by FIGS. 11 and 12, any "pin codes" (e.g., the second authorization pattern 802) can be replaced by any base-10 patterns. A conversion to base-10 could be performed if the original format is compliant. In addition, this base-10 format can be replaced by other numerical bases, including, but not limited to, base-8 or base-12. Additional variations include changing the base-10 into a different base, multiplying all distances by a given fixed number to increase the distances in a predictable way, increasing all distances by adding a given fixed number, or applying an organized algorithm to modify the spacing, among others. In addition, an authentication pattern that is a stream of bits can be converted to a stream of single digit numbers, and then combined. In one embodiment, multiple authentication patterns can be combined into a combined secure pattern without inserting spacing states.

In one embodiment, spacing states ("S3" 821A, "S4" 822A, "S6" 831A, "S7" 832A) can be inserted by the ALU 912 (FIG. 9) into the first authentication pattern 801 (i.e., into the stream of bits, zeros, and ones) one at a time. Each of the spacing states ("S3" 821A, "S4" 822A, "S6" 831A, "S7" 832A) can be, e.g., a "no care" state (BX), a "blocking" (BB) state, a "0" state, or a "1" state. In one embodiment, each of the spacing states can be the same state. In another embodiment, to avoid repetitive patterns that might be easier to compromise and hack, the ALU 912 (FIG. 9) can alternate between different states (e.g., alternate between "0" state and "1" state or alternate between a "no care" state (BX) and a "blocking" (BB) state).

The "no care" state (BX), "blocking" (BB) state, "0" state, and "1" state can be used for a four state system with BLCAM/BLTCAM memory circuits described above. Two state ("0" state and "1" state) and three state ("no care" state (BX), "0" state, and "1" state) can be used with conventional memory circuits, such as any basic non-volatile memory, such as Flash, EEPROM, and OTP, among others, a CAM/TCAM with pattern matching. Although the security level would not be as high, this will represent an enhancement over existing solutions. Furthermore, the edit spacing methods described here can be implemented with a traditional authentication process that does not use a pattern matching process.

As described above, "no care" (BX) or "blocking" (BB) states are not symmetrical, and the storage of a combined secure pattern in the BLCAM/BLTCAM that includes "no care" (BX) or "blocking" (BB) states should follow the first exemplary version (v1) of the BLCAM truth table shown in FIG. 2A or the second exemplary version (v2) of the BLCAM truth table shown in FIG. 2B. For example, a "no care" state (BX) is downloaded instead of a "blocking" state (BB) if BLCAM (v1) is selected. As described above, that due to the asymmetry between "blocking" (BB) and "no care" states (BX), and assuming the case of the first exemplary version (v1) of the BLCAM truth table shown in FIG. 2A, "blocking" states (BB) can be converted to "no care" states (BX) during the personalization cycle.

The exemplary method of edit spacing as described above allows the generation of secure combined patterns that are downloaded in the BLCAM/BLTCAM during the personalization cycle. After verification, and eventual correction if necessary, the BLCAM/BLTCAM will store the combined pattern and keep the information when power is lost, since the flash memory cell is non-volatile. The component is then ready for secure authentication that will not expose the stored pattern.

The edit spacing method described herein is designed to provide a very high level of security. However existing and additional security methods can be included as well to further increase the protection. The highest level of security will be achieved by performing the steps described above of multiplying the number of authentication patterns, encryption, using edit spacing with different methods at each step, inserting "no care" states (BX) and/or "blocking" states (BB) in an asymmetric way, and then employing the matching capabilities of a BLCAM/BLTCAM during authentication. In order to facilitate the reuse of existing components, other methods of employing the BLCAM/BLTCAM are contemplated. For example, a traditional read compare method can be employed during authentication, rather than the matching method. In another example, binary can be used rather than the four states string methodology for the edit spacing methodologies. In a further example, the edit spacing methods described herein can be implemented with standard flash memory arrays. In these examples, the security level will be still stronger than the security provided by existing methods.

In addition, "no care" (BX) and "blocking" (BB) states with edit spacing enhance security by allowing the combination of multiple cryptographic patterns or MACs into a single integrated pattern. With four states ("0"s, "1"s, "BX"s and "BB"s) the patterns stored in a BLCAM/BLTCAM are much more complicated than what a two state ("0"s, and "1"s) memory can store. Accordingly, if a hacker succeeds in extracting the stored pattern, the usage of the stored pattern is harder to de-crypt. To be able to break the system, a hacker must separately extract the various crypto-keys that have been melted together prior to storage, which would be difficult and statistically unlikely.

In view of the foregoing, embodiments of the invention allow the performance of multi-factor authentication. A technical effect is to improve the security of the authentication and the storage of reference patterns to protect against hackers.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of multi-factor authentication comprising:
    receiving a first authentication pattern comprising a first plurality of bits;
    receiving a second authentication pattern comprising a first digit; and
    combining the first authentication pattern and the second authentication pattern into a first combined secure pattern by inserting a first spacing state into the first authentication pattern after a bit location in the first authentication pattern corresponding to the value of the first digit of the second authentication pattern,
    wherein the first combined secure pattern comprises each of the first plurality of bits of the first authentication pattern and the first spacing state, and
    wherein the first spacing state is a zero state, a one state, a no care state, or a blocking state.

2. The method of claim 1, further comprising:
    receiving a third authentication pattern comprising a first digit; and
    combining the first combined secure pattern and the third authentication pattern into a second combined secure pattern by inserting a second spacing state into the first combined secure pattern after a bit location in the first combined secure pattern corresponding to the value of the first digit of the third authentication pattern,
    wherein the second combined secure pattern comprises each of the first plurality of bits of the first authentication pattern, the first spacing state, and the second spacing state, and
    wherein the second spacing state is a zero state, a one state, a no care state, or a blocking state.

3. The method of claim 2 further comprising:
    comparing the second combined secure pattern to a stored reference pattern in a memory circuit to authenticate a user.

4. The method of claim 3, wherein the memory circuit is one of a random access memory (RAM) or a content addressable memory (CAM).

5. The method of claim 1 further comprising:
    comparing the first combined secure pattern to a stored reference pattern in a memory circuit to authenticate a user.

6. The method of claim 5, wherein the memory circuit is one of a random access memory (RAM) or a content addressable memory (CAM).

7. The method of claim 1, wherein the first spacing state is inserted into the first authentication pattern after the bit location in the first authentication pattern equal to the value of the first digit of the second authentication pattern.

8. The method of claim 1, wherein the first spacing state is inserted into the first authentication pattern after the bit location in a first range of bits in the first authentication pattern corresponding to the value of the first digit of the second authentication pattern.

9. A system for multi-factor authentication, the system comprising:
    a central processor unit configured to
        receive a first authentication pattern comprising a first plurality of bits;
        receive a second authentication pattern comprising a first digit; and
        combine the first authentication pattern and the second authentication pattern into a first combined secure pattern by inserting a first spacing state into the first authentication pattern after a bit location in the first authentication pattern corresponding to the value of the first digit of the second authentication pattern, wherein the first combined secure pattern comprises each of the first plurality of bits of the first authentication pattern and the first spacing state, and wherein the first spacing state is a zero state, a one state, a no care state, or a blocking state.

10. The system of claim 9, wherein the central processor unit is further configured to receive a third authentication pattern comprising a first digit; and combine the first combined secure pattern and the third authentication pattern into a second combined secure pattern by inserting a second spacing state into the first combined secure pattern after a bit location in the first combined secure pattern corresponding to the value of the first digit of the third authentication pattern, wherein the second combined secure pattern comprises each of the first plurality of bits of the first authentication pattern, the first spacing state, and the second spacing state, and wherein the second spacing state is a zero state, a one state, a no care state, or a blocking state.

11. The system of claim 10, further comprising a memory circuit configured to compare the second combined secure pattern to a stored reference pattern to authenticate a user.

12. The system of claim 11, wherein the memory circuit is one of a random access memory (RAM) or a content addressable memory (CAM).

13. The system of claim 9, further comprising a memory circuit configured to compare the first combined secure pattern to a stored reference pattern to authenticate a user.

14. The system of claim 13, wherein the memory circuit is one of a random access memory (RAM) or a content addressable memory (CAM).

* * * * *